US012766733B2

(12) United States Patent
Jain et al.

(10) Patent No.: US 12,766,733 B2
(45) Date of Patent: Oct. 20, 2026

(54) ONE-SHOT ROBUST VISUAL-FORCE ROBOTIC SERVOING FOR NOVEL OBJECT INSERTION WITH 6-DOF TRACKING

(71) Applicant: Mitsubishi Electric Research Laboratories, Inc., Cambridge, MA (US)

(72) Inventors: Siddarth Jain, Cambridge, MA (US); Haonan Chang, Highland Park, NJ (US); Abdeslam Boularias, New Brunswick, NJ (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 119 days.

(21) Appl. No.: 18/823,029

(22) Filed: Sep. 3, 2024

(65) Prior Publication Data

US 2026/0061623 A1 Mar. 5, 2026

(51) Int. Cl.
*B25J 9/16* (2006.01)

(52) U.S. Cl.
CPC ........... *B25J 9/1697* (2013.01); *B25J 9/1612* (2013.01); *B25J 9/1653* (2013.01); *B25J 9/1664* (2013.01)

(58) Field of Classification Search
CPC ...... B25J 9/1697; B25J 9/1612; B25J 9/1653; B25J 9/1664
See application file for complete search history.

(56) References Cited

U.S. PATENT DOCUMENTS

2015/0019013 A1* 1/2015 Rose ...................... B25J 9/1612 702/41
2015/0127153 A1* 5/2015 Yamaguchi ............ B25J 9/1697 700/254
2021/0158561 A1* 5/2021 Park .......................... G06T 7/74
(Continued)

FOREIGN PATENT DOCUMENTS

DE 102019105466 B3 * 8/2020 ............ B25J 9/1692
KR 20180114200 A * 10/2018 ............. G06N 3/008

OTHER PUBLICATIONS

Translation of KR 20180114200 A (Year: 2018).*
(Continued)

*Primary Examiner* — Khoi H Tran
*Assistant Examiner* — Andrew Killian Pepper
(74) *Attorney, Agent, or Firm* — Gene Vinokur

(57) ABSTRACT

A system and method are provided for automated assembly of objects, and more specifically for performing assembly of objects involving insertion and part reorientations using a robotic arm. The system performs steps of estimating, from a task-demonstration image, an end-effector's pose and a pre-assemble object pose of the object grasped by an end-effector of the robot, tracking an object pose of the object by performing a 6-degrees of freedom (6-DoF) visual tracking control program using one or more RGB-D cameras, grasping the object using the end-effector by performing the 6-DoF visual tracking control program, moving the end-effector to align the object pose and the pre-assemble object pose, wherein the 6-DoF visual tracking control program is iteratively performed at each time during the moving, and performing an impedance control-based search to assemble the object with the receptacle.

18 Claims, 13 Drawing Sheets

(56) References Cited

U.S. PATENT DOCUMENTS

2021/0394367 A1 * 12/2021 Correll .................. B25J 9/1664

OTHER PUBLICATIONS

Translation of DE 102019105466 B3 (Year: 2020).*
Yang, Yang, et al. "Fast programming of peg-in-hole actions by human demonstrati on." 2014 International Conference on Mechatronics and Control (ICMC). IEEE, 2014.
Wen, Bowen, et al. "You only demonstrate once: Category-level manipulation from single visual demonstration." arXiv preprint arXiv:2201.12716 (2022).
Nair, Ashvin, et al. "Learning on the job: self-rewarding offline-to-online fine tuning for industrial insertion of novel connectors from vision." 2023 IEEE Inte rnational Conference on Robotics and Automation (ICRA). IEEE, 2023.
Schoettler, Gerrit, et al. "Deep reinforcement learning for industrial insertion tasks with visual inputs and natural rewards." 2020 IEEE/RSJ International Conference on Intelligent Robots and Systems (IROS). IEEE, 2020.

* cited by examiner

401

Estimate $T_{CO_p}$, $T_{CE_p}$

| Task | Offset (°) | Method | | |
|---|---|---|---|---|
| | | Direct Control | Insert-One (w/o ICS) | Insert-One (Ours) |
| AMP Connector | 0 | 2/2 | 2/2 | **2/2** |
| | 30 | 1/2 | 0/2 | **2/2** |
| | 45 | 2/2 | 0/2 | **2/2** |
| | -30 | 2/2 | 0/2 | **1/2** |
| | -45 | 2/2 | 0/2 | **2/2** |
| Plug Adapter | 0 | 1/2 | 2/2 | **2/2** |
| | 30 | 0/2 | 2/2 | **2/2** |
| | 45 | 0/2 | 2/2 | **2/2** |
| | -30 | 0/2 | 2/2 | **2/2** |
| | -45 | 1/2 | 2/2 | **2/2** |
| Gear | - | 0/10 | 8/10 | **10/10** |
| Overall | - | 11/30 | 20/30 | **29/30** |

FIG. 13A

| | Direct Control | Insert-One (w/o ICS) | Insert-One (Ours) |
|---|---|---|---|
| $\mathbf{T}_{EO}$ Noise | 0/10 | 3/10 | **7/10** |
| $\mathbf{T}_{BC}$ Noise | 4/10 | 0/10 | **9/10** |

FIG. 13B

ONE-SHOT ROBUST VISUAL-FORCE ROBOTIC SERVOING FOR NOVEL OBJECT INSERTION WITH 6-DOF TRACKING

FIELD OF THE INVENTION

The present disclosure relates generally to a robotic system and method for automated assembly, and more specifically for performing assembly of objects involving insertion and part reorientations using a robotic arm.

BACKGROUND & PRIOR ART

For decades, researchers have been captivated by the pursuit of autonomous robotic assembly, with a particular focus on the insertion problem. Commonly known as the Peg-in-Hole Insertion (PIH) problem, it involves assembling an insertion object into a stationary receptacle object. Despite its prevalence in industrial settings, achieving complex, high-precision assembly in unstructured environments remains a formidable challenge. Uncertainties stemming from variations in grip alignment, object positions, discrepancies in parts, and calibration errors can result in failures and collisions with surfaces. In unstructured scenarios, where both grasping and insertion are required for assembly, particularly those with minimal tolerances, relying solely on meticulous calibration often proves insufficient. Moreover, these uncertainties evolve during the physical interactions between the robot and the object. Incorporating feedback systems can help mitigate uncertainties by providing real-time information during physical interactions.

One possible approach to addressing the insertion problem involves utilizing force sensing to determine the position of the receptacle. Assuming both the insertion object and the receptacle reside on a common plane, the object is navigated across the plane of the receptacle hole in a search pattern to maintain contact throughout the search. Nonetheless, such methodologies that solely rely on force feedback are limited to scenarios where the alignment of the insertion object and the receptacle is initially approximate. Another area of research investigates learning vision and visuo-tactile feedback policies for industrial insertion tasks. However, this approach has limited generalization capabilities and necessitates texture on the insertion object for effective tactile perception.

It is also noteworthy to mention the increasing trend of integrating reinforcement learning (RL) into insertion tasks. While supervised deep learning and RL methods have achieved remarkable progress, they rely on extensive training data specific to each target object. The training phases are typically lengthy, and require online fine-tuning, intricate reward design, and struggle with generalizing to new object categories. Introducing objects unseen during training therefore requires a significant effort to synthesize or annotate data and retrain the model. This restricts the application of such methods in industry. For instance, in a factory assembly line process, it appears impractical to retrain the object pose estimation and control policy for every new product. Additionally, precise assembly requires addressing the practical challenge of managing camera calibration errors and grasp pose disturbances simultaneously, a topic that has received limited attention in prior research. While some systems operate under specific assumptions, such as a well-calibrated camera pose or a fixed or pre-defined grasp pose facilitated by fixtures in structured settings, addressing both challenges concurrently remains largely unexplored.

To address these gaps, effective strategies are needed for developing robotic systems and methods that are less data-intensive and more generalizable. These strategies should enable automated assembly and insertion of new objects while reducing the dependence on training data, precise camera calibration, and pre-defined or fixed grasp poses to enhance the system's robustness against uncertainties in these areas.

SUMMARY OF THE INVENTION

In industrial assembly tasks, the position of an object grasped by the robot has to be known with high precision in order to perform assembly. Accordingly, some embodiments commonly solve this problem by jigs or fixtures in structed setting that are specially produced for each part. Alternatively, some other embodiments assumes rigid attachment of the inserted object to the robot's end-effector and relies on precise calibration. However, such systems and methods significantly limit flexibility. Moreover, introducing new products therefore requires a significant effort to design new fixtures with a system integrator and restricts the application in industry.

To that end, it is an object of some embodiments to reduce reliance on precise camera and pre-determined grasp poses during computations. Some embodiments provide a hybrid visual-force servoing method with object pose tracking focusing on a precise alignment stage and an assembly stage to enhance the method's robustness to uncertainties in camera calibration and grasping errors. This makes the made more generalizable for picking objects from unknown orientations and performing insertions for assembly. It is an object of some embodiments to provide a system and method for enabling a robot to perform assembly involving insertions of new objects from randomly presented orientations. Some embodiments introduce visual pose tracking and real-time visual feedback to achieve resilience against uncertainties arising from camera pose calibration errors and disturbances in the object in-hand pose from unstructured grasping while performing assembly. This follows a vision-guided coarse alignment phase to position the object close to the receptacle, followed by force servoing during the insertion phase. Although hybrid techniques has shown promise, many two-stage methods depend on traditional visual servoing techniques with manually crafted visual features, which can lead to instability.

Providing generalization across different object categories for assembly is challenging. Accordingly, some embodiments use simulation training and large datasets to achieve generalization. Introducing objects unseen during training therefore requires a significant effort to synthesize or annotate data and retrain the model. Learning in these scenarios could also be challenged by risks to the robot and its equipment in contact-rich tasks. This restricts the application of such methods in industry. Some embodiments are based on recognizing that zero-shot model-based tracking can eliminate the need for extensive datasets and training processes for performing automated assembly. Zero-shot pose tracking method compares current measurements against renderings from a provided computer aided design (CAD) model of the object. However, existing zero-shot perception approaches are generally designed for tasks with large workspace domains and tolerances, focusing largely on navigation problems. To that end, it is an object of some embodiments to enable precise assembly tasks with small tolerances (in mm) while achieving generalization capabilities across different object categories with zero-shot pose tracking of objects.

Some embodiments disclose learning-from-demonstrations (LfD) methods for assembly. The idea of demonstration-based insertion is inspired by the observation that humans do not require elaborate search patterns for insertion tasks. Some embodiments employ kinesthetic teaching of robot trajectories with force-feedback to gather demonstration data, while others utilize tracking systems to capture robot trajectories and replicate them for automated insertion. This approach involves creating a trajectory dataset from demonstrations to develop a policy for object assembly and insertion. However, collecting these demonstrations can be time-consuming and often requires expertise. Thus, it is an object of some embodiments to introduce method for single-shot demonstration setting to mitigate the need for a training phase, while also reducing the data required for demonstration. Some embodiments streamline the process by requiring only a static image as a demonstration for performing assembly. Useful information is extracted from just a single image demonstration for performing the task.

It is an object to some embodiments to address the challenges of performing insertion for novel objects in a one-shot context, while accounting for errors stemming from grasping and visual pose estimation. Accordingly, some embodiments disclose a system for one-shot novel object assembly with effective hybrid control strategies using zero-shot object pose tracking for feedback that only requires CAD models of the target objects. The system provides one-shot generalization using just a single RGB-D image as a demonstration, achieving adaptability across diverse object categories and tasks without a learning phase that requires costly real-world data collection. Notable the demonstration is a static image rather than a video. The system deploys a hybrid control strategy with vision and force servoing stages with zero-shot model-based 6-DoF visual tracking, enabling seamless adaptation to new object categories. During the visual alignment phase, a tracking-based feedback control system is deployed to synchronize the object's pose within the demonstration image. After achieving alignment, the system transition to utilizing impedance control for full insertion of the object. The system adopts an object-centric approach to the visual servoing process and aim to reduce reliance on precise camera and grasp poses during computations. This strategy enhances the algorithm's robustness to uncertainties in these aspects.

According to some embodiments, a method is provided for one-shot novel object assembly with effective hybrid control strategies using zero-shot object pose tracking for feedback that only requires CAD models of the target objects. The method provides one-shot generalization using just a single RGB-D image as a demonstration, achieving adaptability across diverse object categories and tasks without a learning phase that requires costly real-world data collection. Notable the demonstration is a static image rather than a video. The method deploys a hybrid control strategy with vision and force servoing stages with zero-shot model-based 6-DoF visual tracking, enabling seamless adaptation to new object categories. During the visual alignment phase, a tracking-based feedback control method is deployed to synchronize the object's pose within the demonstration image. After achieving alignment, the method transition to utilizing impedance control for full insertion of the object. The method adopts an object-centric approach to the visual servoing process and aim to reduce reliance on precise camera and grasp poses during computations. This strategy enhances the algorithm's robustness to uncertainties in these aspects.

Further, some embodiments of the present invention provide a system for automated assembly and insertion of objects. The system may include a robotic arm including links connected by joints having actuators and encoders, and a gripper of an end-effector of the robotic arm configured to grasp and release a target object in response to robot control signals; vision sensors configured to continuously provide visual observations of an environment; a memory configured to store a task demonstration image, data from the vision sensors, arm motion generation programs, a pose estimation program, and data representative of an environment, the environment including components of the automated assembly including a target object and a receptacle object; and a processor, in connection with the memory, configured to perform steps of: estimating, from a single task-demonstration image, an end-effector's pose and a pre-assemble object pose of the target object; identifying and tracking an object pose of the target object from environment images; generating a grasp on the target object and grasping the target object from a random position and orientation using the end-effector by determining a sequence of motions; moving the robotic arm to align the object pose and the pre-assemble object pose determining a sequence of motions, wherein each of the pose estimation program and the arm motion generation programs is iteratively performed for pose estimation and control of the robotic arm at each time during the moving; assembling the object with the receptacle object using the robotic arm by performing an impedance control search using a search pattern.

Yet, further, some embodiments of the present invention provide a method for automated assembly and insertion of objects, by using a robotic arm including links connected by joints having actuators and encoders, and a gripper of an end-effector of the robotic arm configured to grasp and release a target object in response to robot control signals. The method may include steps of: continuously acquiring visual observations of an environment via vision sensors; estimating, from a single task-demonstration image, an end-effector's pose and a pre-assemble object pose of the target object; identifying and tracking an object pose of the target object from environment images; generating a grasp on the target object and grasping the target object from a random position and orientation using the end-effector by determining a sequence of motions; moving the robotic arm to align the object pose and the pre-assemble object pose determining a sequence of motions, wherein each of a pose estimation program and an arm motion generation program is iteratively performed for pose estimation and control of the robotic arm at each time during the moving; assembling the object with a receptacle object using the robotic arm by performing an impedance control search using a search pattern.

BRIEF DESCRIPTION OF THE DRAWINGS

The accompanying drawings, which are included to provide a further understanding of the invention, illustrate embodiments of the invention and together with the description serve to explain the principle of the invention. The drawings shown are not necessarily to scale, with emphasis instead generally being placed upon illustrating the principles of the presently disclosed embodiments.

FIG. 13A shows example results of insertion experiments on a variety of tasks, where the test objects are shown in FIG. 10;

FIG. 13B shows results of experiments on noise resistance and robustness, according to embodiments of the present invention; and While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

Figure 1:
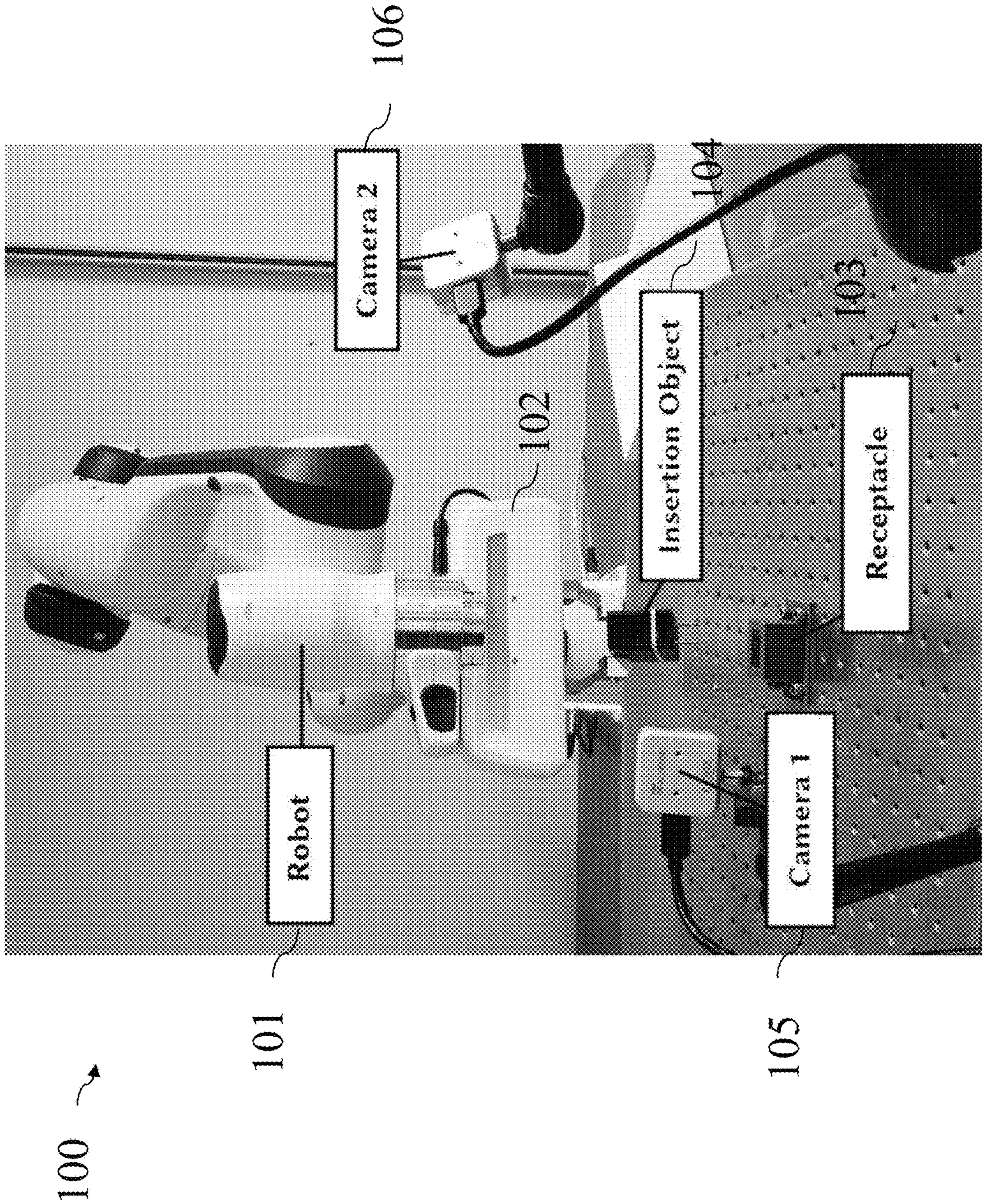
FIG. 1 shows a robotic setup for the insertion tasks, according to embodiments of the present invention.

Various embodiments of the present invention are described hereafter with reference to the figures. It would be noted that the figures are not drawn to scale elements of similar structures or functions are represented by like reference numerals throughout the figures. It should be also noted that the figures are only intended to facilitate the description of specific embodiments of the invention. They are not intended as an exhaustive description of the invention or as a limitation on the scope of the invention. In addition, an aspect described in conjunction with a particular embodiment of the invention is not necessarily limited to that embodiment and can be practiced in any other embodiments of the invention.

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms “for example,” “for instance” and “such as,” and the verbs “comprising,” “having,” “including,” and their other verb forms, when used in conjunction with a listing of one or more components or other items, are each to be construed as open ended, meaning that the listing is not to be considered as excluding other, additional components or items. The term “based on” means at least partially based on. Further, it is to be understood that the phraseology and terminology employed herein are for the purpose of the description and should not be regarded as limiting. Any heading utilized within this description is for convenience only and has no legal or limiting effect.

The problem of robotic assembly involving insertion, has been a focal point of research for many years. Several proposed solutions can be classified according to the sensory data they employ, encompassing for example force, images, and tactile sensory inputs. One key challenge is to achieve generalization with robustness. Some embodiments of the present disclosure provide system and method for one-shot insertion of novel objects with robust visual-force servoing.

Problem Formulation

FIG. 1 shows the problem settings with the robotic system setup 100 for the insertion tasks. Some embodiments of the present invention consider the assembly-with-insertion tasks involving two objects. For simplicity, one object is designated as a stationary receptacle 103 while the other serves as an insertion object 104 that is randomly positioned on a flat surface at the start of the task. The robotic arm includes links connected by joints having motion actuators and sensor encoders, and a gripper of an end-effector for performing pick and place operations. The joint states of the robotic arm are provided by one of more sensors includes one or more of joint positions, velocity, and torque values. The robot is assumed to only know the pose of the receptacle 103. Initially, the robot must perceive and securely grasp the insertion object with its end-effector 102 and then reposition it so that it snugly fits inside the receptacle 103.

Unlike prior research, it is an object of some embodiments to eliminate certain assumptions. Specifically, the settings are unstructured in that it does not presume a rigid connection between the grasped object 104 and the end-effector 102. Unlike previous methods where the object is firmly affixed to the robot's gripper or other fixtures, some embodiments allow the object to translate and rotate during grasping and manipulation.

Figure 2:
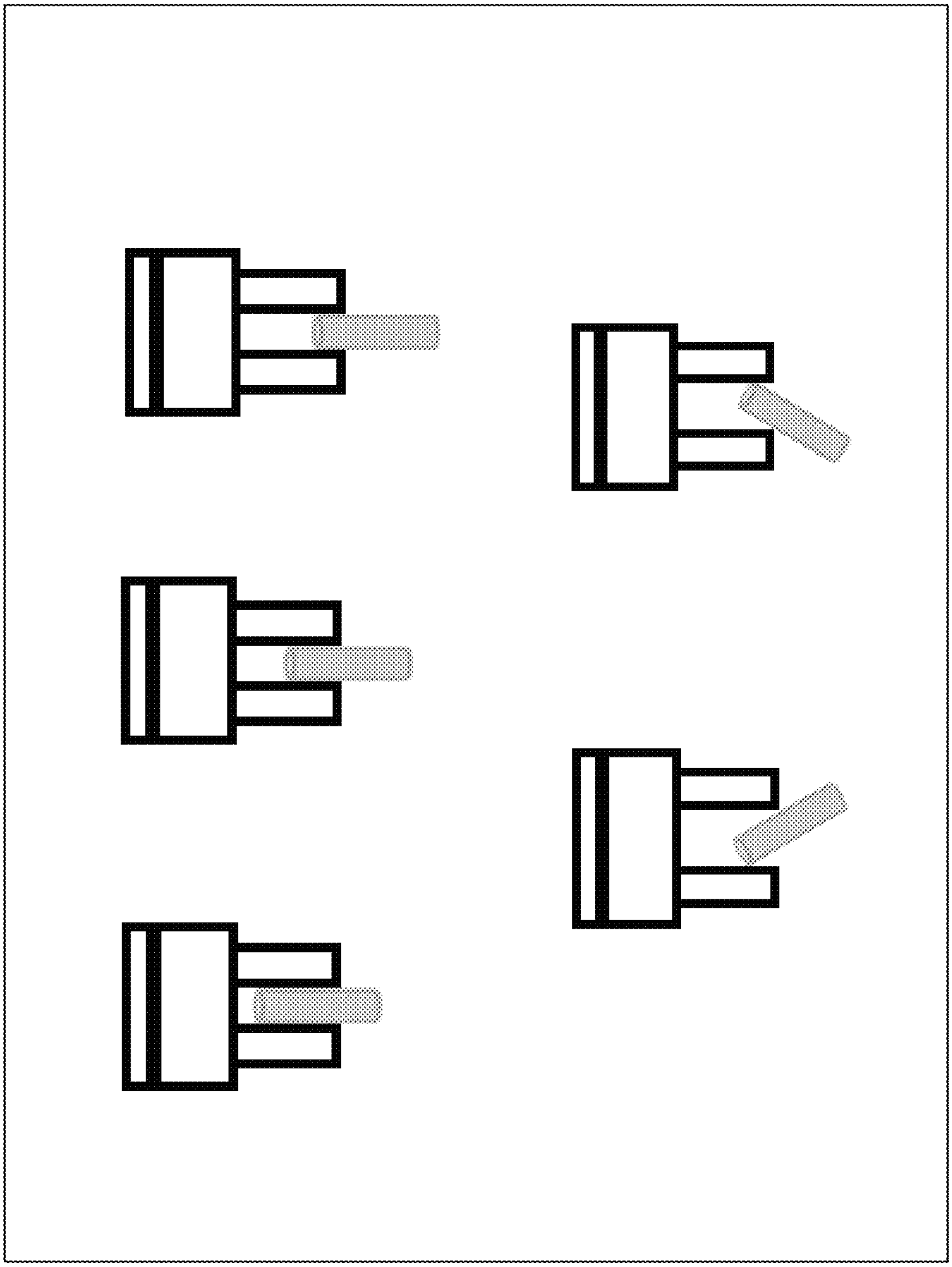
FIG. 2 shows illustration of in-hand object pose uncertainty after grasping with different positions and orientations of object in the end-effector, according to embodiments of the present invention.
Figure 3:
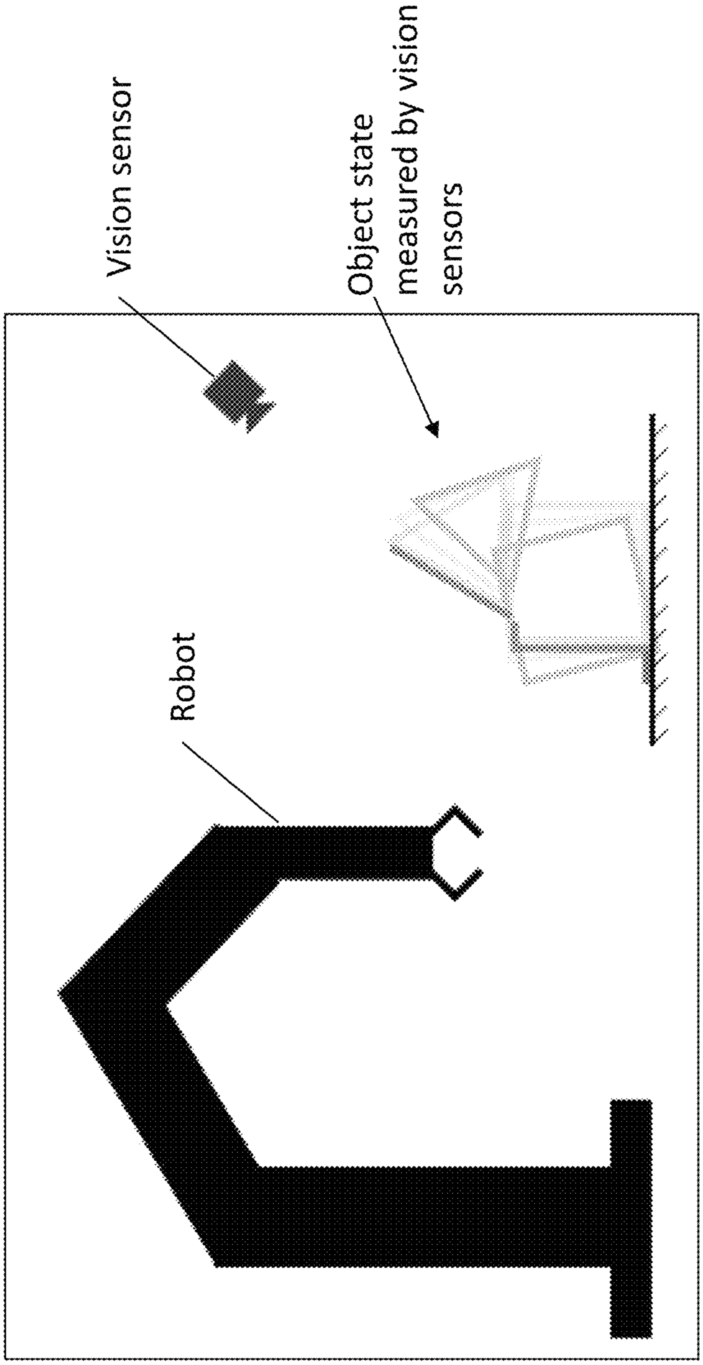
FIG. 3 shows illustration of object pose uncertainty with visual perception because of camera calibration errors, according to embodiments of the present invention.

FIG. 2 shows an illustration of examples of different poses of the grasped object in the end-effector after grasping the object from random position and orientation. The objects that the robot grasps and manipulate has uncertainty in its positon and orientation in the robot's hand, especially when picked from a flat surface or a bin (not from a jig or a fixed location). These pose uncertainty of the object often causes assembly or insertion to fail, as it requires precision. It is an object of some embodiments of this disclosure to handle the in-hand object pose uncertainty after grasping from a random object pose for performing robust insertion and assembly FIG. 3 shows an illustration of uncertainty in the object pose perception from random position and orientation of objects because of camera calibration errors. These pose uncertainty of the object often causes assembly or insertion to fail, as it requires precision. It is an object of some embodiments of this disclosure to handle the uncertainty and errors from calibration errors for performing robust insertion and assembly.

In some embodiments the robot 101 relies on vision feedback for grasping and in-hand object pose localization. Some embodiments use RGB-D cameras as vision sensors, wherein one of more cameras are arranged at locations separated from the robotic arm and configured to provide the visual observations of the environment as images that constitute image data comprising information of a depth channel, a first color channel, a second color channel, and a third color channel. To address occlusion challenges during robotic assembly, some embodiments employ a dual-camera setup for effective pose tracking. The insertion process depends on tracking the grasped object's 104 in-hand 6-DoF pose, estimated from color and depth images captured by RGB-D cameras 105 and 106. Some embodiments use a pose estimation program to perform 6-DoF pose tracking of the insertion object. Some embodiments select one of the two cameras as the major camera 105. All operations involving camera coordinates are performed under the major camera's coordinates.

In some embodiments of the present disclosure, a coordinate transformation $T_{SA} \in \mathbb{SE}(3)$ denotes a 4×4 homogeneous transformation matrix that describes the origin coordinates of a given frame {A} and the orientation of its axes, relative to a given reference frame {S}. The transformation matrix represents a combination of rotation and translation in the 3D space, given by the rotation matrix $R_{SA} \in \mathbb{SO}(3)$ and the translation vector $t_{SA} \in \mathbb{R}^3$. The transformation between the camera frame {C}, and a robot base frame of interest {B} is denoted as $T_{BC}$. This transformation can be computed using the standard procedure for base-eye calibration with a printed visual tag pattern. The base frame is fixed to the robot frame (i.e. center of the robot base). The tool pose refers to the end-effector frame at each time-step t, denoted as $T_{BE}[t]$, that describes the position of the end-effector's origin and the orientation of its axes relative to the reference base frame {B}. This coordinate transformation can be automatically calculated using the joint angles and known kinematic equations. Some embodiments define the distance between two transformations TA and TB as the sum of their rotation and translation distances:

$$dist(T_A, T_B) = \frac{Tr(R_A R_B{}^T) - 1}{2} + \|t_A - t_B\|_2. \tag{1}$$

Method Description

Some embodiments of this invention propose a two-stage vision-and-force servoing process that we refer to as Insert-One.

It is an object of some embodiments of this disclosure to provide one-shot generalization for robust insertion and assembly of novel objects. Some embodiment of this disclosure provide one-shot generalization with a single image demonstration, eliminating the need for a training phase for the insertion of novel objects.

One-Shot Image Demonstration: Some embodiments of the present disclosure provide a single task demonstration image to teach the robot where to position the object before insertion and how the object should be grasped. The object is moved into the pre-insertion pose right above the receptacle, through kinesthetic teaching.

Figure 4:
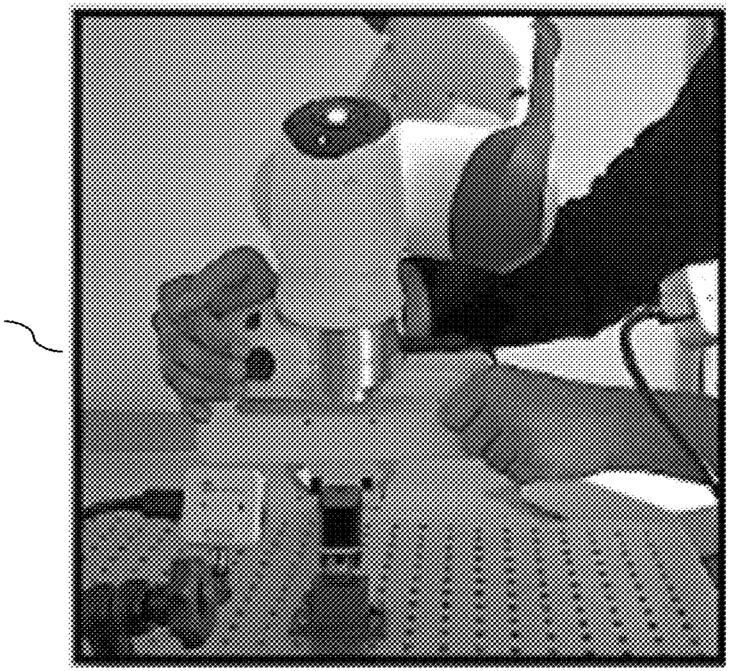
FIG. 4 shows an example of a demonstration image and extraction of useful information from the demonstration, according to embodiments of the present invention.

FIG. 4 shows an example of the image demonstration where the robot is moved into the pre-insertion pose and a single task demonstration image $I_g$ is recorded 401. The image $I_g$ is taken from the major camera. Some embodiments employ kinesthetic teaching by a user to gather demonstration image, while other embodiments use a arm motion generation program to gather demonstration image. Some embodiment extract useful information from the single demonstration image to perform assembly and insertion, without any training dataset and learning. Some embodiments perform object pose tracking on the demonstration image to estimate the pre-insertion pose of the object $T_{CO_p}$ in the camera's coordinates and also estimate the end-effector's pose from the image as $T_{CE_p}$. This information is then used to perform insertion and assembly as described.

Figure 5:
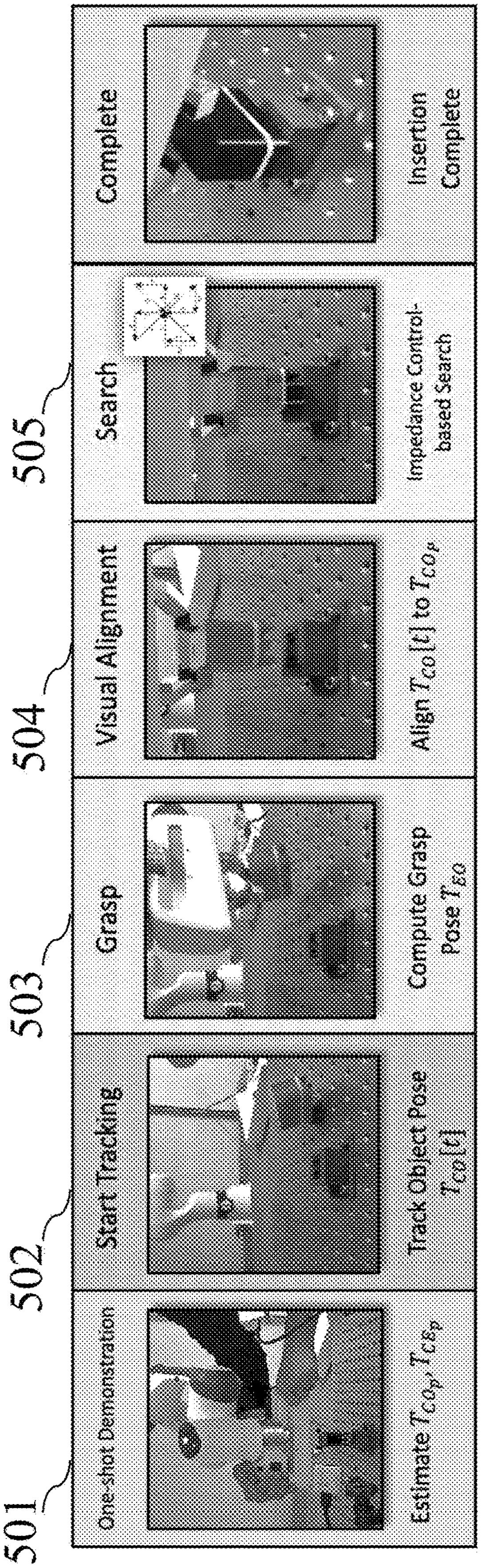
FIG. 5 shows an example processes one-shot insertion of novel objects with visual-force servoing, according to at least one embodiments of the present invention.

FIG. 5 shows an overview of Insert-One according to embodiments of the present invention. In offline phase, a single demonstration image is recorded 501 as described above and information is automatically extracted from the demonstration image, commuting $T_{CO_p}$ in the camera's coordinates and the end-effector's pose from the image as $T_{CE_p}$. This single-shot demonstration setting mitigate the need for a training phase. During testing, the insertion object 104 is placed in a random initial pose that is unknown.

Some embodiments perform 6-DoF real-time tracking 502 using inputs from one of more RGB-D cameras to compute the object pose $T_{CO}[t]$ at each time t. Then, a object in-hand pose $T_{EO}$ of the object in the end-effector's frame is computed. Recent advancements involve the fusion of deep learning with visual servoing methodologies. Traditional pose estimation methods relied on template matching but had limitations in applicability and stability. Recent advancements in deep learning-based object pose estimation have gained traction for their ability to achieve better accuracy. However, these methods often require extensive offline training for specific objects and categories. Some embodiments of this invention involves zero-shot model-based pose tracking, which compares current measurements against renderings from a provided CAD model of the object, eliminating the need for extensive datasets and training pipelines. This adaptation facilitates generalization for accommodating randomly introduced novel objects.

Grasping: According to coordinate transformations, some embodiments compute the object's 6-DoF pose $T_{CO}[t]$ and the robotic end-effector's pose $T_{CE}[t]$ in the same camera coordinates, and compute the object in-hand pose as:

$$T_{EO}[t] = T_{CO}[t] \cdot T_{CE}{}^{-1}[t]. \tag{2}$$

The object in-hand pose $T_{EO}[t]$ in Eq. 2 refers to the pose of the object in the end-effector's frame. From the demonstrated object pose $T_{CO_p}$ and end-effector pose $T_{CE_p}$, some embodiments compute an initial object in-hand pose $T_{EO_p}$. The current end-effector's pose for grasping at t is then given as:

$$T_{BE} = T_{BC} T_{CO}[t] T_{EO_p}^{-1}. \tag{3}$$

Some embodiments of the present disclosure use position control of the robot to move the end-effector to $T_{BE}$ and then conduct grasping of the insertion object. After grasping, it is required to know the achieved object in-hand pose using Eq. 2 because sliding and other types of disturbance can occur during grasping manipulation causing uncertainty in the in-hand pose of the object. The robotic arm is configured to grasp the target object with the end-effector using the computed grasp pose.

Some embodiments of the present disclosure proposed tracking-based feedback control to first achieve pose alignment while an adaptive search-based impedance control is then used to execute the appropriate contact forces during the assembly. The first stage, termed as visual-alignment stage 504, involves picking up the insertion object and then using a tracking-based feedback control to guide the object towards the pre-insertion pose. This pre-insertion pose is estimated from the single demonstration image 501. A zero-shot model-based 6D tracker is deployed during this phase. The tracker returns the object's pose in the camera coordinates at each time-step. The object may not be perfectly centered in the end-effector after grasping 503. The visual alignment stage 504 continues with visual feedback until the grasped object pose is sufficiently close to the pre-insertion pose. During the visual alignment stage, a tracking-based feedback control is used by the robot to continuously synchronize the object's pose $T_{CO}[t]$ with the demonstrated pose $T_{CO_p}$.

Upon reaching this point, some embodiments transition to the second stage, termed as the search stage 505. It consists of a local search for performing an insertion in the receptacle with impedance control. Both stages are integral to the process. The first stage 504 is responsible for maneuvering the randomly presented insertion object accurately into a pose above the receptacle that is suitable for insertion. This first phase cannot ensure a successful insertion because of the high level of precision that is required, and the complexities associated with the contact-rich nature of the task. The search stage 505 addresses and resolves these challenges with impedance control and a search pattern guidance.

6-DoF Object Pose Tracking: The object's 6-DoF pose is tracked 502 to facilitate grasping, pre-insertion manipulation, and final assembly with continuous post-grasp displacement estimation. The challenge arises in industrial settings where many objects may vary vastly in shapes and textures, posing an extra training expense for object-level or category-level pose trackers. To address this and facilitate generalization, some embodiments of the present disclosure employ a zero-shot model-based 6-DoF pose tracker. Some embodiments achieve zer-shot tracking of the object with iterative corresponding geometry (ICG). This optimization-based tracker utilizes contour correspondences to iteratively refine the pose, making it adaptable to various novel objects without the need for pre-training in real-world scenarios. To address occlusion challenges during robotic assembly, some embodiments employ a dual-camera setup for effective pose tracking, where one of the two cameras is the major camera. All operations involving camera coordinates are performed under the major camera's coordinates. Object pose $T_{CO}[t]$ and end-effector pose in the camera's coordinates $T_{CE}[t]$ are tracked at each time-step t, using the object and the robot hand CAD models.

Visual-alignment Stage: In some embodiments, the objective of this stage is to execute a grasp that can effectively and dependably pick up the object from a randomly presented position, and then guide the object towards the pre-insertion pose above the receptacle. Some embodiments perform tracking based feedback control. After picking up object O, some embodiments aim to move it to the demonstrated pre-insertion pose $T_{CO_p}$. The control goal in this step is to minimize the error:

$$e_C = dist(T_{CO}[t], T_{CO_p}). \tag{4}$$

The objects pose $T_{CO}[t]$ in the camera's coordinates is computed from tracking. $T_{BE}[t]$ is the pose of the robot's end-effector, which we can measure and control directly. According to the problem formulation, we also have a roughly calibrated camera pose $T_{BC}$. By inserting the pre-insertion pose $T_{CO_p}$ into this transformation chain, we can derive the desired end-effector pose at this stage as:

$$T_{BE_p} = T_{BC} T_{CO_p}[t](T_{EO}[t])^{-1}, \tag{5}$$

where $T_{BE_p}$ is the estimated end-effector pose for pre-insertion. We use position control to move the end-effector to a reference position $T_{BE_r}$. First, we set $T_{BE_r}=T_{BE_p}$. Some embodiments name the control strategy until this step Direct Control. In some embodiments, a tracking-based feedback control for visual alignment 504. The reference control position, $T_{BE_r}$ is updated in its rotation $R_{BE_r}$ and translation $t_{BE_r}$ separately using the following formula:

$$R_{BE_r}[t+1] = \Phi\left(R_{BC} R_{CO_p} R_{CO}^{-1}[t], K_R\right) R_{BE}[t] \tag{6}$$

$$t_{BE_r}[t+1] = K_t \cdot R_{BC}\left(t_{CO_p} - t_{CO}[t]\right) + t_{BE}[t] \tag{7}$$

Here, $K_t$ and $K_R$ are feedback gains for rotation and translation separately. $\Phi(\bullet, K_R): \mathbb{SO}(3) \rightarrow \mathbb{SO}(3)$ is a mapping that scales the rotation by $K_R$.

$$\Phi(R, K_R) = \exp(K_R \log(R)),\ R \in \mathbb{SO}(3). \tag{8}$$

Here, exp and log are matrix exponential and logarithm. In practice, we set $K_t=1$ and $K_R=0.3$. Intuitively, some embodiments track the current pose of the object in the camera coordinates $T_{CO}[t]=(R_{CO}[t], t_{CO}[t])$. Then, compute the difference between $T_{CO}[t]$ and the pre-insertion pose in the camera's coordinates $T_{CO_p}=(R_{CO_p}, t_{CO_p})$. Since this residual is defined in the camera's coordinates, it is transferred then back to the robot's frame using the robot-camera calibration $T_{BC}$. Some embodiments then apply this movement to the end-effector's current pose, $T_{BE}[t]=(R_{BE}[t], t_{BE}[t])$. In some embodiments, the tracking stage converges when $e_c<\epsilon$, where $\epsilon$ is a pre-defined parameter (set to 1e-5).

Search Stage: Once the object has been moved to its pre-insertion position $T_{CO_p}$, in some embodiments, the fine-tuned search process commences 505. Although in the previous stage the robot has tried to move the object to $T_{CO_p}$, which is right above the receptacle, a straightforward push down in practice cannot always succeed. There are two main reasons behind this failure: (1) The pre-insertion pose $T_{CO_p}$ is estimated from the demonstration image $I_g$. Thus, $T_{CO_p}$ includes a pose estimation error. (2) The tracking-based feedback control has a control error. With these two combined, the initial position of the object at this stage has a small misalignment with the receptacle.

The misalignment can be too small to be overcame by visual servoing alone. Therefore, instead of trying to predict the exact object's pose, in some embodiment some the present disclosure the robot follows a search-based strategy for insertion with an impedance-control search method 505.

In force-based servo methods, a common strategy involves estimating receptacle position through contact state modeling. Planar search techniques assess the positional relationship between the peg and the hole by analyzing the torque resulting from their positional disparity. These methods commonly employ search pattern methods. However, this restricts applicability to scenarios where the peg and hole are already approximately aligned. Some embodiments of this invention, achieve the required precise initial alignment with the visual alignment stage 504.

Task Space Impedance Control: In some embodiments, a task space impedance controller (TSI) is used to make sure the object and the receptacle are being in contact during the search. The impedance controller formula can be written as follows:

$$F = M_d(\ddot{x}_d - \ddot{x}) + D_d(\dot{x}_d - \dot{x}) + K_d(x_d - x) \tag{9}$$

Here F is the force applied by the robot. x, ẋ, ẍ are the desired position, velocity, and acceleration in the task space. $M_d$, $D_d$, $K_d$ are the desired mass, damping, and stiffness matrices. In practice, we set the damping and stiffness matrices as follows:

$$K_d = \begin{bmatrix} K_d^t & 0 \\ 0 & K_d^R \end{bmatrix}, K_d^t = 500 \cdot I_{3\times3}, K_d^R = 100 \cdot I_{3\times3}, \tag{10}$$

$$D_d = 2.0 \cdot \sqrt{K_d}. \tag{11}$$

Here, $$K_d^t$$

is the stiffness for translation and $$K_d^R$$

is the stiffness for rotation. Some embodiments set the rotation stiffness $$K_d^R$$

to be smaller than the translation stiffness $$K_d^t$$

to make the end-effector's orientation easier to change so that the object and receptacle surface are in full contact. $M_d$ is dependent on system identification. Here the default $M_d$ in the robot's control library can be used.

Figure 6:
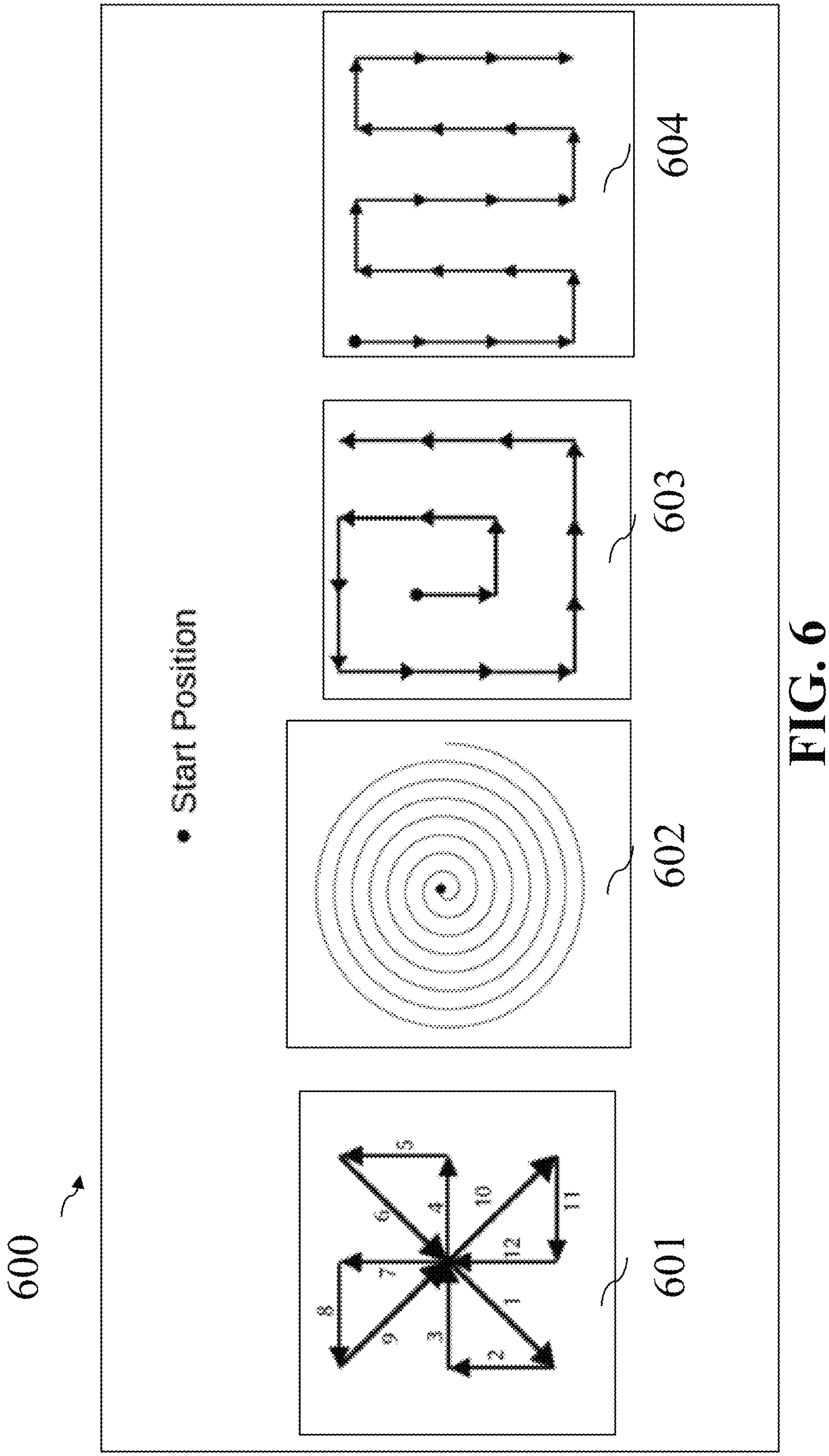
FIG. 6 shows illustration of windmill search pattern and other search patterns for insertion tasks, according to embodiments of the present invention.

Search Strategy: There are many different search patterns for insertion. FIG. 6 shows illustration of different search patterns 600 that can be used for insertion tasks. It includes windmill search 601; Archimedes spiral search 602; square spiral search 603; and raster search 604. It is an object of some embodiments of this invention to achieve generalization across different shapes of objects for assembly and insertion tasks. Thus, in some embodiments of this invention the robot uses an impedance control-based search along a windmill pattern 601 to successfully insert the object. The windmill pattern provides flexibility to search the receptacle across different geometric shapes of the insertion object. This search strategy is chosen because the first stage of this invention has already roughly aligned the object to the center of the receptacle, so it needs a symmetrical search pattern. In practice, if the object is cylindrical, one can also follow a spiral search. Some embodiments set the frame of reference's origin on the upper surface of the receptacle, with the z-axis pointing up. The goal value of the z coordinate for the controller is set to 1 mm lower than the receptacle's upper surface in order to ensure that the object and the receptacle maintain contact during the search. In the meantime, the z-value of the end-effector's pose $T_{BE}$ [t] is continuously monitored. Whenever a significant drop (larger than 2 mm) in that z-value is detected, the object is assumed to be already partially inserted. Subsequently, the target z-value of the control is reset to 5 mm below the current z-value, which results in a full insertion.

Figure 7:
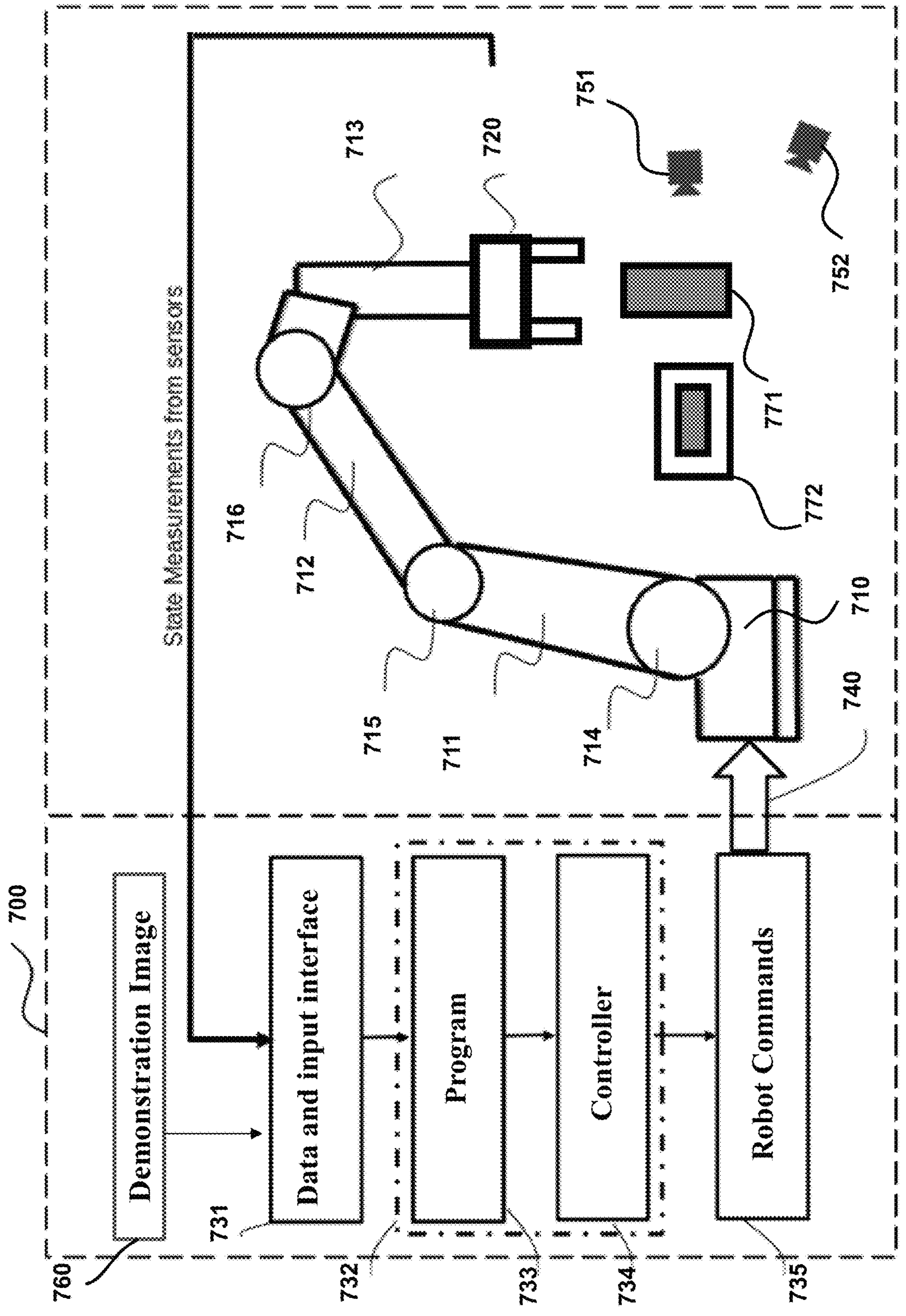
FIG. 7 illustrates an example system for one-shot insertion of novel objects with visual-force servoing, according to at least one embodiments of the present invention.

FIG. 7 shows Insert-One system for one-shot insertion of novel objects. The robotic system 700 may include a robotic arm 710 manipulator equipped with sensors for state measurements and a computer-instrumented system for storing data and controlling the manipulator arm. The manipulator arm may include several rigid links 711, 712, 713 and joints 714, 715, 716 and an end-effector 720. The manipulator arm 710 is controlled using a robot controller 734 that generates a command or task (robot commands) 735 that may be externally supplied to the system 700. The controller 734 sends commands for a task that could be a control signal 740 that operates the actuators of the manipulator arm 710. The task could be performing assembly and insertion of an insertion object 771 and a receptacle object 772. The insertion object 771 may be randomly placed with unknown position and orientation in the environment of the robotic arm 710. The robot controller 734 sends the control signals 740 to the robotic arm manipulator 710. The control signal 740 could be the torques or velocity commands to be applied at each of the joints of the manipulator and opening/closing of gripper 720. The robotic arm may manipulate the insertion object 771 using the end-effector 720 of the manipulator to grasp the insertion object 771 from an unknown position and orientation. The state of the robotic system is measured using sensors. These sensors may include encoders at the joints of robot 714, 715, 716, configured to detect the joint positions, velocity, and torque values. The environment may also include one or more cameras as vision sensors 751 and 752 that can observe the environment of the robot. The camera sensors can be fixed in the environment or can be attached to the end-effector of the manipulator arm 710. Some embodiments of the disclosure initialize the Insert-One system 700 with a demonstration image 760 for the desired task. The state measurements from sensors are sent to a data input/output unit 731 which stores the data received from the sensors. This data and the demonstration image 760 is used by software containing computer program 733 for updating or executing the control commands 735 of the robotic arm 710 with the controller 734. The program 733 is configured to use the demonstration image 760 to automatically extract information about the task for assembling the insertion object 771 and the receptacle object 772. The program 733 tracks the position and orientation of the insertion object 771 in the camera images using the vision sensor 751 and 752 for controlling the robot arm 710 to perform the task. The program 733 for updating the robot control commands 735 with the controller 734 may be the Insert-One method program 732.

Figure 8:
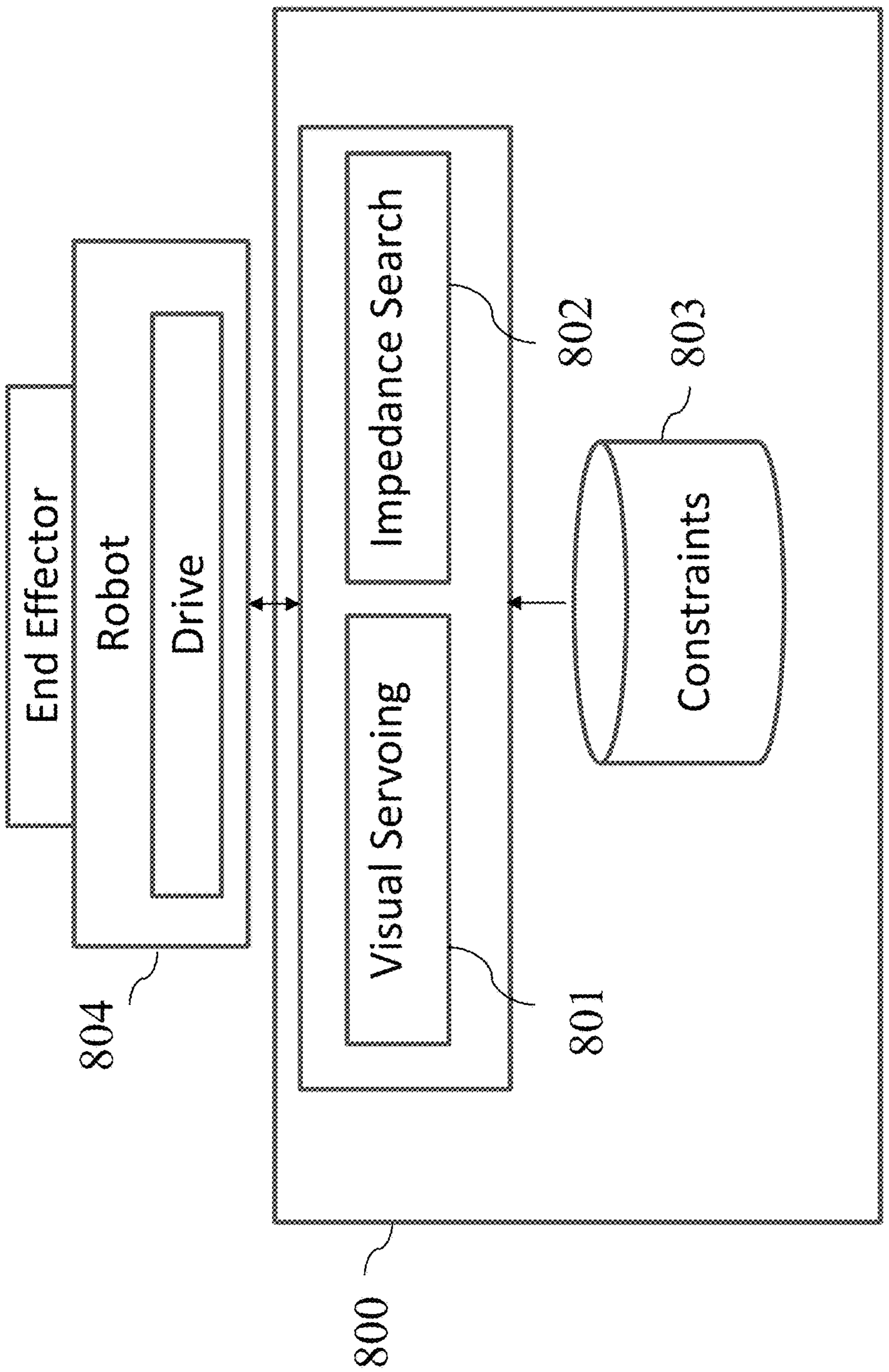
FIG. 8 illustrates components of a distributed system for one-shot insertion of novel objects with visual-force servoing, according to at least one embodiments of the present invention.
Figure 9:
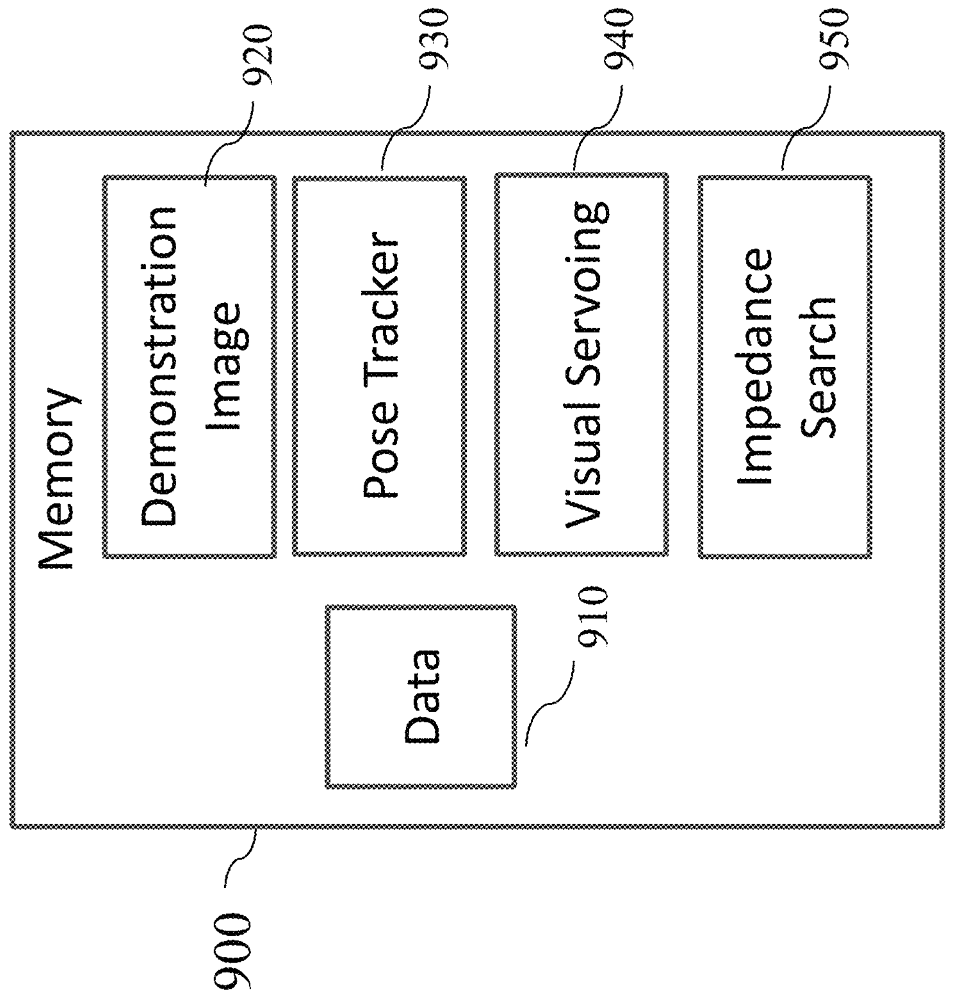
FIG. 9 illustrates programs stored in memory for one-shot insertion of novel objects with visual-force servoing, according to at least one embodiments of the present invention.

FIG. 8 shows a diagram illustrating components of the robot controller 800 according to embodiments of the present invention. The robot controller 800 is initialized with hybrid visual-force controllers for the desired task. A arm motion generation program performs low-level motion control of the robotic arm with robot control signals based on the hybrid visual-force controllers. The visual control 801 perform visual servoing using feedback from the vision sensors. The force control is performed with task-space impedance control 802 using a search pattern to perform the assembly. The search patter may be a windmill search. The parameter and constraints 803 are specified for the controller. The controller 800 then computes the robot commands and transmits the control signals to the drive system of the robot which controls the actuators of the robotic arm manipulator 804 for performing the desired task. The controller 734 may interface with a data input/output interface (data input/output interface circuit), a processor (not shown) and a memory 900. FIG. 9 shows an illustration of the memory that is configured to store programs, data 910, pose tracker 930, where the program for updating the control commands may be the Insert-One method program for computing the control commands. The program may include software programs to extract information from the demonstration image 920. It may also include a position and orientation tracker using visual images, visual servoing program 940, and a impedance search program 950. The data may include images, and models of the objects and the environment.

Numerical Simulations

FIG. 11 shows results of numerical simulations demonstrating that the visual alignment with feedback control is able to converge even in the presence of considerable errors in $T_{BC}$ and $T_{EO}$. The tracking stage converges when $e_c<\epsilon$, where $\epsilon$ is a pre-defined parameter (set to 1e-5). FIG. 11 shows results of numerical simulations for evaluating the convergence and robustness of visual alignment of Insert-One method under varying levels of injected object in-hand pose noise and camera pose noise, according to an embodiment of the present disclosure. The pose of insertion object is generated in camera coordinates as, $$T_{CO}[t]=T_{BC}^{-1}T_{BE}[t]T_{EO}. \tag{12}$$

Figure 11B:
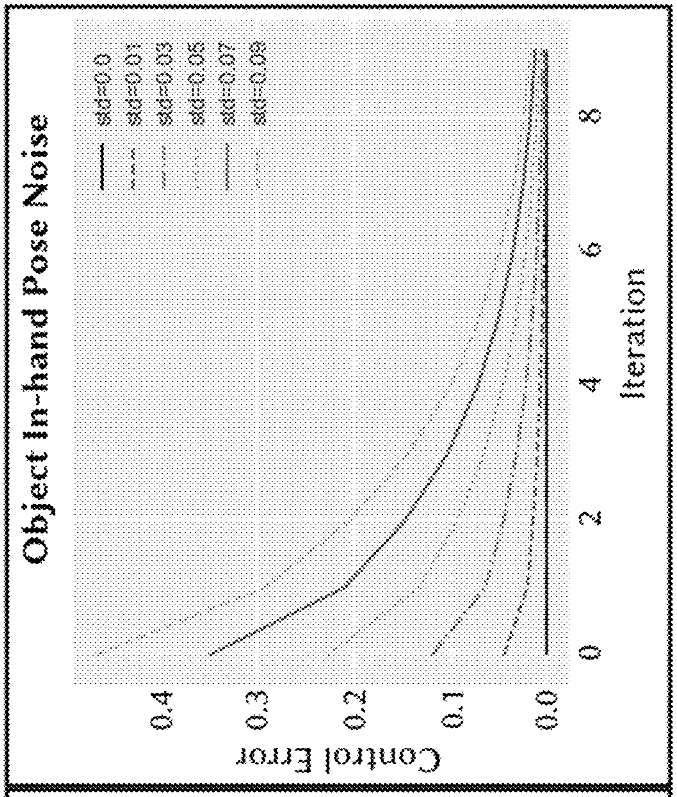
FIG. 11B shows control error $e_c$ as a function of iteration n, object in-hand pose noise, according to embodiments of the present invention.
Figure 11A:
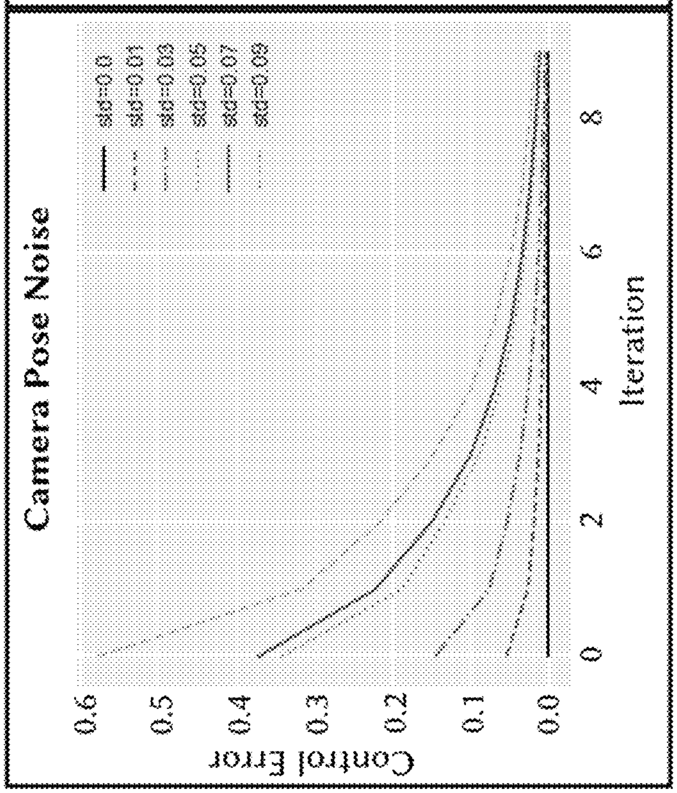
FIG. 11A shows control error $e_c$ as a function of iteration n, under different levels of injected camera pose noise, according to embodiments of the present invention.

The ground-truth values for $T_{BC}$ and $T_{EO}$ are used to simulate the ground-truth $T_{CO}[t]$ at each time-step. Then the visual-alignment process is performed numerically. The $T_{BC}$ and $T_{EO}$ used during control is injected with Gaussian noise with variance $\sigma$, to verify if the control can converge with existence of calibration error and object in-hand pose disturbance. FIG. 11 shows graphically the variation of the average control error $e_c$ of 100 different goal poses as a function of control iterations n under different levels of object in-hand pose errors and camera pose errors. FIG. 11A and FIG. 11B show control error $e_c$ as a function of iteration n, under different levels of injected camera pose noise (FIG. 11A) and object in-hand pose noise (FIG. 11B). As depicted in the results, both camera pose error and object in-hand pose estimation error significantly increase the initial control error $e_c$. However, with the progression of the tracking-based feedback control, it is observed a gradual and steady reduction in this error.

Baseline & Ablation

Direct Control: Direct Control refers to a method that only use the estimated pre-insertion pose $T_{BE_p}$ without the following tracking-based feedback control during the visual alignment stage. After end-effector is moved to $T_{BE_p}$, it follow the same impedance control search strategy as in Insert-One method.

Insert-One w/o ICS: To investigate importance of the search stage, tests are done with a variant of Insert-One without the impedance control search (ICS). After the first visual alignment stage, instead it only perform a push-down during the second stage.

Real-World Experiments

Experiments validate the Insert-One method, to assess the generalization, spatial invariance, and robustness of the approach.

Figure 10:
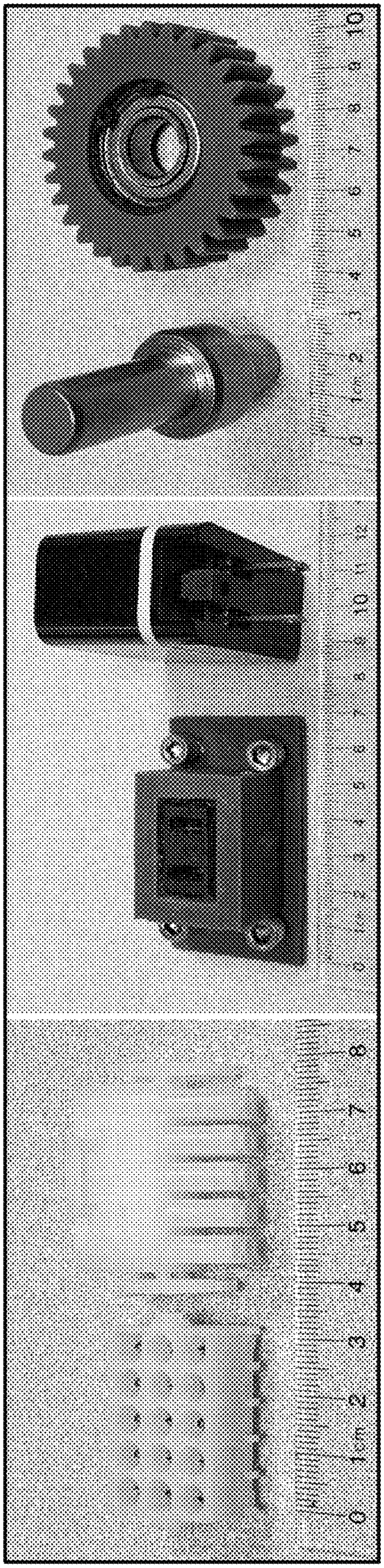
FIG. 10 shows example objects used in the experiments, according to embodiments of the present invention.

Experimental Settings: The setup consists of a Franka Emika Panda robotic arm with 7 revolute joints and its control software running on a Desktop computer with Ubuntu 20.04. Two Intel RealSense D405 Depth Cameras are mounted for the multi-camera setup to facilitate 6-DoF visual tracking with RGB-D inputs. The experimental configuration is depicted in FIG. 1. The components featuring extruded characteristics (insertion objects) are positioned atop an optical breadboard and possess freedom of movement. Conversely, components with mating features (receptacles) also assume randomized poses but are securely fastened to the breadboard to mimic industrial fixturing. The objective entails perceiving, tracking, grasping, transporting, and inserting all insertion objects into their respective receptacles. FIG. 10 shows objects used in the experiments, according to embodiments of the present invention. The tasks incorporate six distinct types of components, as illustrated. From left to right, the objects are: AMP Connector PLUG (15-pin), AMP Connector HEADER, Power PLUG Adapter (NEMA 1-15P), Power PLUG Receptacle (NEMA 1-15R), Shaft (14.6 mm dia.), and Spur Gear (GE-ABDM2.0-30-20, 15 mm hole dia.).

These components vary in size, utility, number of pins, and visual appearance, offering a diverse range for assessment. The precision required for insertion tasks operates at sub-millimeter tolerances. Unlike prior studies that typically rigidly mount a test connector to the robot gripper or secure it in fixtures, our approach addresses the broader challenge of autonomous assembly with randomly positioned insertion object. This dynamic scenario accounts for handling uncertainty due to manipulation dynamics, with changes in object pose during grasping and manipulation.

Figure 12:
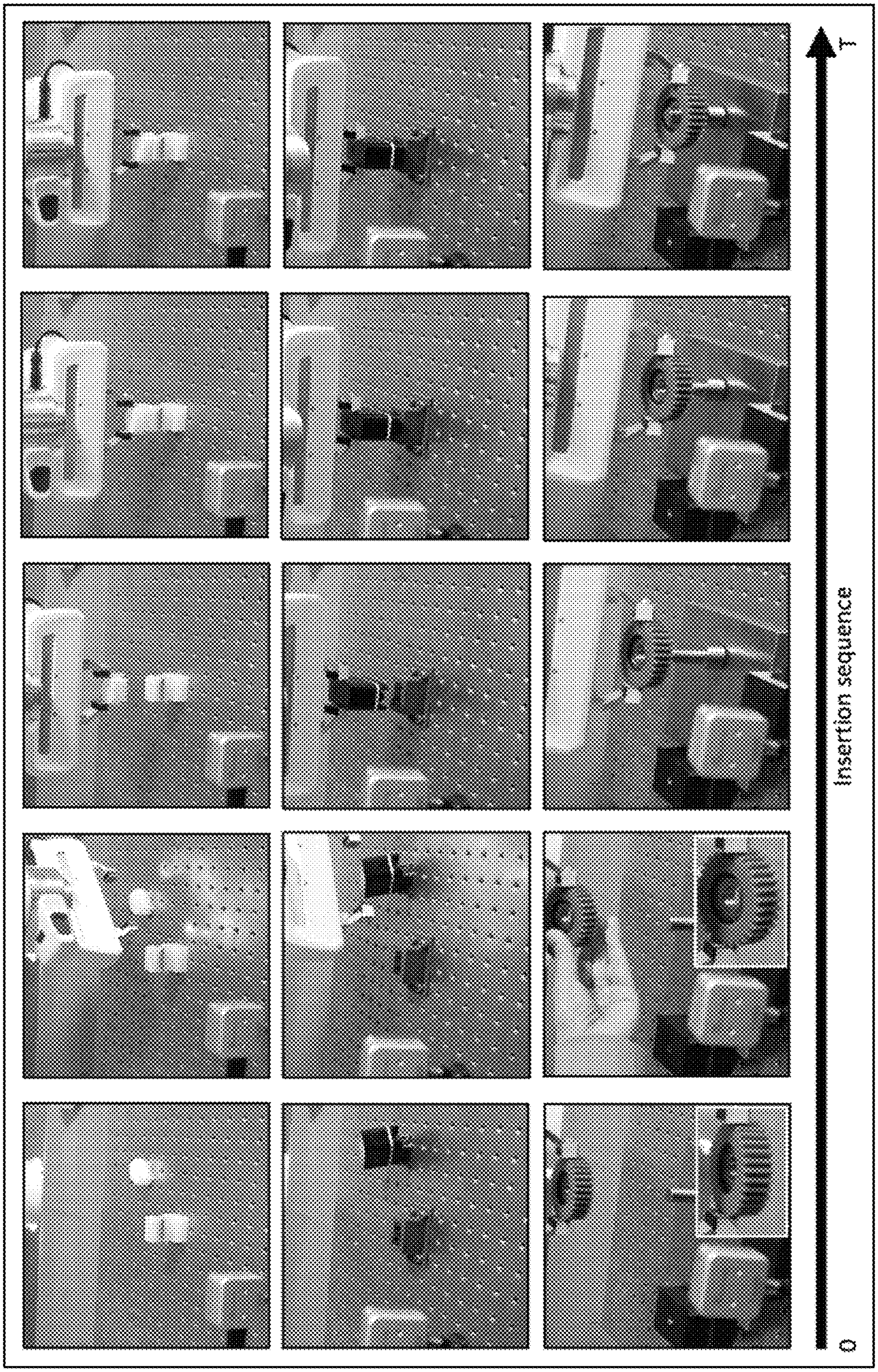
FIG. 12 shows examples of real-world experiments, according to embodiments of the present invention.

Insertion Experiments: In the first set of experiments, distinct insertion tasks were conducted to test spatial invariance and generalization, wherein the insertion object was placed flat on a table in varying initial configurations. The tasks encompassed the insertion of a standard AMP 15-pin connector, an electrical adapter, and a Spur Gear (Misumi GEABDM2.0-30-20). Each configuration underwent testing from five distinct poses of the insertion object. For the first two objects, we set an offset angle $\theta$ set to 0, 30, 45, −30, or −45. Since the spur gear is a symmetric object, we do not present offset in the initial gear pose, but instead, we introduce an in-hand perturbation to the gear pose after grasping. FIG. 12 shows examples of real-world experiments, according to embodiments of the present invention. From top to bottom, the inserted objects are: (1) AMP connector, (2) Plug Adapter, and (3) Gear. We showcase five key frames from each experiment: (1) beginning of tracking, (2) grasping, (3) visual alignment stage, (4) search stage, and (5) insertion completion. The gear insertion experiment evaluated robustness, wherein the gear pose is disturbed externally after its grasped by the robot. The two zoomed insert pictures show the difference between the gear's poses before and after external disturbance.

The external perturbations, ranging approximately +1 cm in translation and +10 degrees in rotation from the initial in-hand grasp. We conduct 10 trials for each task. An insertion is deemed successful only if the insertion object is fully seated in the receptacle. The outcomes of these experiments are summarized in FIG. 13A and FIG. 13B.

We compare Insert-One method against two alternatives: Direct Control combined with Impedance Control Search (ICS), and Insert-One without ICS. Results indicate that, although Direct Control and Insert-One (w/o ICS) each perform well in some trials, these methods are not stable to maintain performance across the variety of tasks, achieving 36.6% and 66.6% overall success rate, respectively. Direct control although accompanied by impedance search in the baseline, may not always minimize $e_c$ sufficiently since the camera calibration $T_{BC}$ is not accurate. The performance gain by our method is significant, achieving overall 96.6% performance. Ours consistently accomplishes the task regardless of the object category and initial conditions. The results highlights the importance of the visual alignment and impedance search module of Insert-One, for generalization and robustness in the proposed one-shot settings.

Robustness: To investigate the noise resistance of Insert-One method in real-world conditions robustness tests are performed S. The system inputs include the camera pose, $T_{BC}$, and the object in-hand pose, $T_{EO}$. To assess robustness in real-world settings, we manually introduced a translation noise with a standard deviation of 8 mm and a rotation noise with a standard deviation of 8 degrees to $T_{BC}$ and $T_{EO}$ separately in two experiments. Subsequently, we ran our proposed system and other baseline methods under these disturbances. The results, as detailed in FIG. 13, demonstrate t Insert-One framework effectively resists disturbances, unlike the baseline methods. In this case, To noise refers to object in-hand pose estimation noise. $T_{BC}$ noise refers to camera pose noise. This experiment is performed with the AMP 15-pin Connector.

The major strength of Insert-One method lies in that using only a single image demonstration, it excels in inserting new objects with high accuracy in precise manipulation tasks. Moreover, it showcases resilience to uncertainties stemming from calibration and disturbances in object pose, rendering it highly effective for practical applications. We don't compare to learning-based approaches, as our focus lies in generalization within one-shot settings, devoid of any pre-training on objects and tasks. Relaxing certain assumptions outlined in this study could open up avenues for future research directions. While achieving zero-shot 6-DoF pose tracking necessitates a clear understanding of the geometry of the tracked objects, and to some extent their distinction from the background, this becomes notably more intricate with smaller objects. Although geometric information is typically accessible for numerous industrial parts, it highlights a limitation that could be mitigated through the development of more advanced tracking methods.

Nevertheless, incorporating additional sensor modalities, like tactile sensing, holds promise for further advancements.

The above-described embodiments of the present invention can be implemented using hardware, software, or a combination of hardware and software.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

We claim:

1. A system for automated assembly and insertion of objects, comprising:

a robotic arm including links connected by joints having actuators and encoders, and a gripper of an end-effector of the robotic arm configured to grasp and release a target object in response to robot control signals;

vision sensors configured to continuously provide visual observations of an environment;

a memory configured to store a task demonstration image, data from the vision sensors, arm motion generation programs, a pose estimation program, and data representative of an environment, the environment including components of the automated assembly including a target object and a receptacle object; and a processor, in connection with the memory, configured to perform steps of:

estimating, from a single task-demonstration image, an end-effector's pose and a pre-assemble object pose of the target object;

identifying and tracking an object pose of the target object from environment images;

generating a grasp on the target object and grasping the target object from a random position and orientation using the end-effector by determining a sequence of motions;

moving the robotic arm to align the object pose and the pre-assemble object pose determining a sequence of motions, wherein each of the pose estimation program and the arm motion generation programs is iteratively performed for pose estimation and control of the robotic arm at each time during the moving;

assembling the object with the receptacle object using the robotic arm by performing an impedance control search using a search pattern, wherein the search pattern is a windmill search.

2. The system of claim 1, wherein one or more vision sensors are arranged at locations separated from the robotic arm and configured to provide the visual observations of the environment that constitute image data comprising information of a depth channel, a first color channel, a second color channel, and a third color channel.

3. The system of claim 1, wherein a combination of the target object and the receptacle object is a combination of a peg and a hole, or a connector plug and a connector head, or a combination of a power plug adapter and a power plug receptacle, or a combination of a shaft and a spur gear.

4. The system of claim 1, wherein the objects involved in the automated assembly are novel in that no prior-training or learning is performed on object identity or geometry and only computer-aided design (CAD) models of the objects are provided.

5. The system of claim 1, wherein the position and orientation of the target object is not known at start of the automated assembly.

6. The system of claim 1, wherein there is no rigid connection between the end-effector of the robotic arm and the target object.

7. The system of claim 1, wherein the task demonstration image is taken by using a major vision sensor, wherein the major vision sensor is selected from at least two vision sensors.

8. The system of claim 7, wherein the task demonstration image is taken such that the target object is grasped by the end-effector and positioned right above the receptacle object.

9. The system of claim 7, wherein the robot is operated manually by a user or an automated program to provide the demonstration image.

10. The system of claim 1, wherein each of the vision sensors provides the visual observations to the processor that computes and tracks spatial location of the object as a six-dimensional (6D) pose of the object indicative of a position and orientation of the object at each time from the visual observations relative to a sensor frame, or the gripper frame, or a base frame of the robotic arm.

11. The system of claim 10, wherein the pose estimation of objects is performed in zero-shot settings, such that no training or learning data of the objects are used.

12. The system of claim 1, wherein the processor computes a grasp pose on the target object and grasps the object using the end-effector by determining a sequence of motions.

13. The system of claim 1, wherein the processor performs a visual alignment process of the target object with the receptacle object by moving the robotic arm to align a current insertion object pose and the pre-assemble object pose determining a sequence of motions.

14. The system of claim 13, wherein the visual alignment process converges when an error between the pre-assemble object pose and the current insertion object pose computed in camera's coordinates is less than a pre-defined parameter.

15. The system of claim 1, wherein the processor performs impedance control search after visual alignment to successfully assemble the target object with the receptacle object using the search pattern.

16. The system of claim 15, wherein the impedance control search is task-space impedance control.

17. The system of claim 1, wherein joint states of the robotic arm provided by one of more sensors includes one or more of joint positions, velocity, and torque values.

18. A method for automated assembly and insertion of objects, by using a robotic arm including links connected by joints having actuators and encoders, and a gripper of an end-effector of the robotic arm configured to grasp and release a target object in response to robot control signals, comprising steps of:

continuously acquiring visual observations of an environment via vision sensors;

estimating, from a single task-demonstration image, an end-effector's pose and a pre-assemble object pose of the target object;

identifying and tracking an object pose of the target object from environment images;

generating a grasp on the target object and grasping the target object from a random position and orientation using the end-effector by determining a sequence of motions;

moving the robotic arm to align the object pose and the pre-assemble object pose determining a sequence of motions, wherein each of a pose estimation program and an arm motion generation program is iteratively performed for pose estimation and control of the robotic arm at each time during the moving;

assembling the object with a receptacle object using the robotic arm by performing an impedance control search using a search pattern, wherein the search pattern is a windmill search.

* * * * *